A. W. HALL.
Improvement in Combined Friction and Ratchet Clutch.
No. 122,009.                                     Patented Dec. 19, 1871.
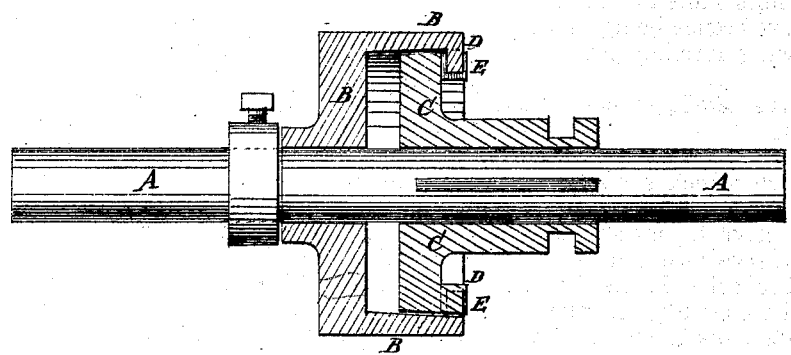
Witnesses:
A. W. Almqvist
Francis McArdle
Inventor:
A. W. Hall
per
Munn & Co
Attorneys.

UNITED STATES PATENT OFFICE.

ABIJAH WHITNEY HALL, OF NORTHFIELD, VERMONT.

IMPROVEMENT IN COMBINED FRICTION AND RATCHET CLUTCHES.

Specification forming part of Letters Patent No. 122,009, dated December 19, 1871.

*To all whom it may concern:*

Be it known that I, ABIJAH WHITNEY HALL, of Northfield, in the county of Washington and State of Vermont, have invented a certain Improvement in Combined Friction and Ratchet Clutch; and I do hereby declare that the following is a full, clear, and exact description thereof, which will enable others skilled in the art to make and use the same, reference being had to the accompanying drawing forming part of this specification.

The figure is a detail vertical section of my improved clutch.

My invention has for its object to furnish an improved clutch, which shall be simple in construction, comparatively inexpensive in manufacture, and effective in operation, being so constructed as to serve both as a friction and ratchet clutch; and it consists in the clutch constructed as hereinafter more fully described.

A represents a shaft, upon which the pulley B runs loosely. The inner surface of the projecting rim of the pulley B is made slightly conical to receive the slightly-conical face of the head of the clutch C. The clutch C is connected with the shaft A by a tongue and groove, so that the said clutch may be moved longitudinally upon the shaft A; but both clutch and shaft must revolve together. The outer end of the clutch is grooved, as shown in the figure, to receive the end of the lever by which it is moved out and in. To the inner surface of the outer edge of the projecting rim of the pulley B are attached two (more or less) lugs or ratchet-teeth, D, upon which an equal number of lugs or ratchet-teeth, E, formed upon the outer side of the head of the clutch C, take hold, as shown in the figure.

With this construction, when either the shaft A or pulley B is in motion and the motion is to be communicated to the other of said parts, the clutch C is pushed inward to serve as a friction-clutch to give motion to the other of said parts. When the shaft and pulley have both acquired the same velocity the clutch C is moved outward, so that the lugs or ratchet-teeth E D of the clutch and pulley C B may take hold of each other to drive any required amount of machinery.

Having thus described my invention, I claim as new and desire to secure by Letters Patent—

The clutch C provided with a conical head and with lugs or ratchet-teeth E, in combination with the conical inner surface of the rim of the pulley B and with the lugs or ratchet-teeth D attached to said rim, substantially as herein shown and described, to adapt the clutch to serve both as a friction and as a ratchet-clutch, as set forth.

ABIJAH WHITNEY HALL.

Witnesses:
 EDWARD INGALLS,
 S. F. JUDD.